July 2, 1963

C. PROCHNOW 3,096,025

PHOTOGRAPHIC FLASH APPARATUS

Filed Dec. 14, 1960

United States Patent Office 3,096,025
Patented July 2, 1963

3,096,025
PHOTOGRAPHIC FLASH APPARATUS
Claus Prochnow, Braunschweig, Germany, assignor to Franke & Heidecke, Fabrik Photographischer Prazisions-Apparate, Braunschweig, Germany, a firm of Germany
Filed Dec. 14, 1960, Ser. No. 75,823
Claims priority, application Germany Dec. 23, 1959
4 Claims. (Cl. 240—1.3)

The present invention relates to an accessory for a photographic camera and, more particularly, to a lighting apparatus for flash photography.

An object of the invention is to provide a generally improved and more satisfactory flash lighting apparatus of the magazine type.

Another object is the provision of a new and improved magazine flash lighting assembly which is relatively small in size while yet being attractive in appearance and simple to handle.

Still another object is the provision of a simplified flash apparatus comprising a casing or housing unit and a turret-like magazine unit placeable in and removable bodily from the housing unit, a plurality of individual lamp bulbs being placeable in or removable from the magazine unit when the latter is removed from the housing unit and being successively brought into operative flashing position by rotating the magazine unit when it is in normal operating position within the housing unit.

A further object of the invention is to provide a new and improved flash lighting apparatus wherein the lamps in the magazine unit are not immediately ejected, but are removed when the entire magazine is removed from the housing or casing unit.

These and other desirable objects may be attained in the manner disclosed as an illustrative embodiment of the invention in the following description and in the accompanying drawings forming a part hereof, in which.

Figure 1:
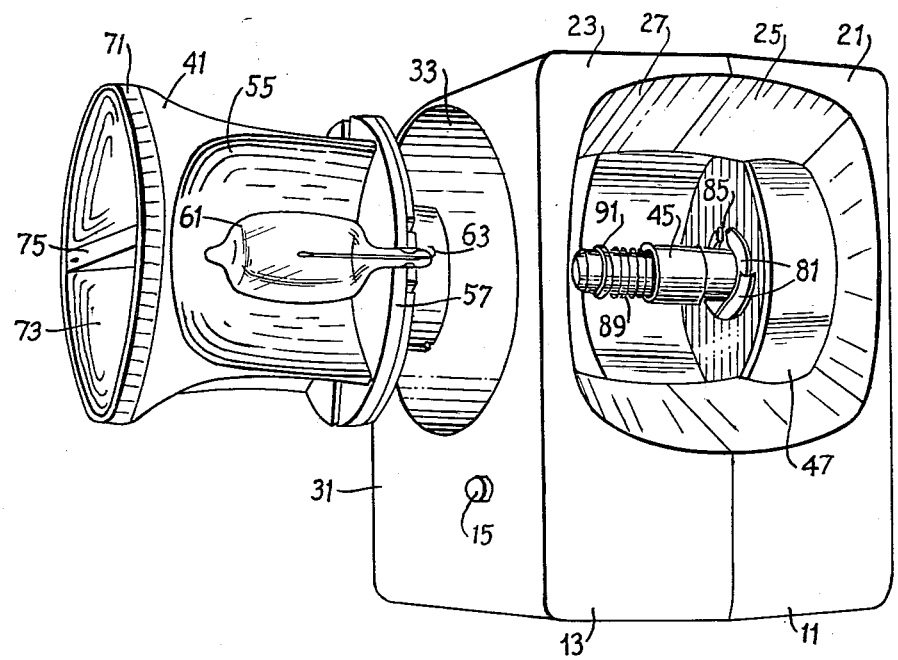
FIG. 1 is a perspective view of the complete apparatus with the magazine unit removed from the housing unit but properly alined therewith ready for insertion therein.
Figure 2:
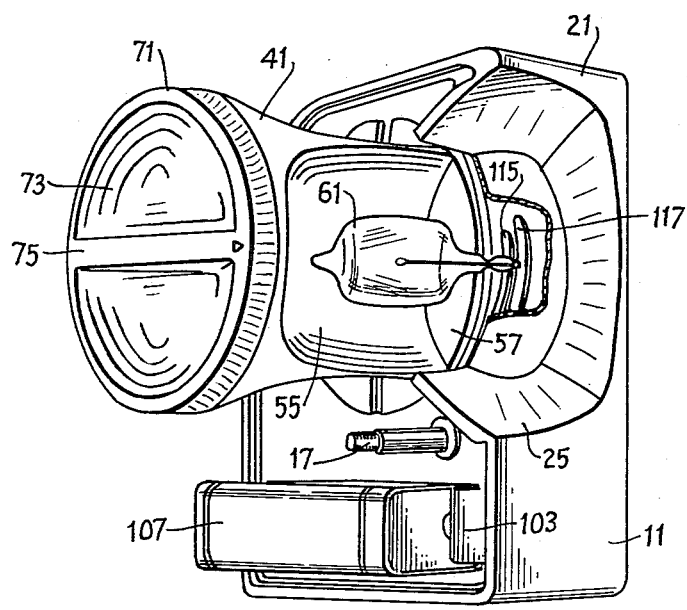
FIG. 2 is a perspective view of the lighting apparatus with the magazine unit fully introduced into the housing unit but with half of the housing unit removed and portions broken away to show interior detail.

The flash lighting apparatus of the invention generally comprises a housing or casing unit, which might also be called a reflector unit, and a lamp-holding magazine unit. The reflector unit includes a housing having two halves 11 and 13 held together detachably by an externally accessible cap nut 15 threaded on a screw 17 secured to the housing part 11. The front walls 21 and 23 of the housing are recessed inwardly to provide a pair of dished reflecting surfaces 25 and 27, respectively.

The side wall 31 on the housing half 13 has a cylindrical bore 33 extending through to the other housing half 11. As will be clearer later, these reflecting surfaces 25 and 27 are only a portion of the total reflecting surface, as these surfaces 25 and 27 terminate where they intersect the bore 33. The axis of the bore 33 is approximately perpendicular to the optical axis of the reflector and is disposed immediately to the rear of what would be the apex of the reflecting surfaces.

Figure 5:
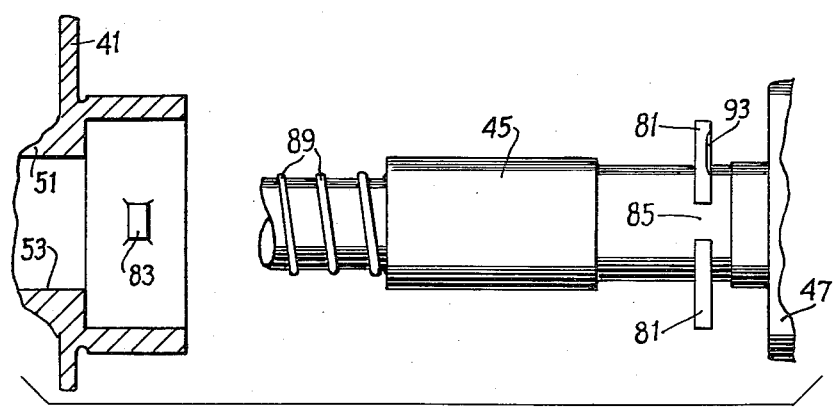
FIG. 5 is a fragmentary side view, partly in section, of the coupling between the pivot pin on the housing unit and the magazine unit.

A cylindrical magazine unit indicated in general at 41 is in the form of a drum and is adapted to be inserted laterally of the housing unit (but axially of the magazine unit) into the bore 33. For this purpose, a pivot pin 45 is secured to the side wall 47 of the housing half 11. Referring to FIG. 5, the magazine 41 has a central cylinder or tubular portion 51 defining a bore 53 which slides axially onto the pivot pin 45 and is releasably fastened in place in a manner explained below.

Figure 3:
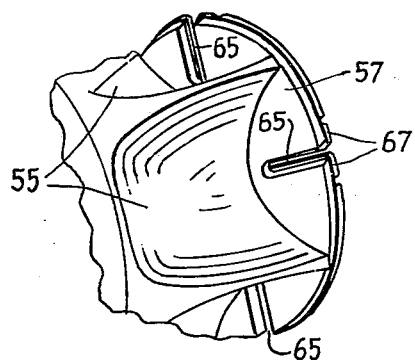
FIG. 3 is a fragmentary perspective view of the base portion of the magazine unit with the flash lamps removed.

The magazine 41 more particularly comprises a plurality of dished recesses or reflecting surfaces 55 extending leftwardly from a base plate 57. A flash lamp 61 is mounted in each of the reflecting surfaces 55. The flash lamps 61 may be of any suitable kind but the type here illustrated has a pinched base from the bottom end of which the electrodes 63 project. To mount the lamps 61 on the base 57, there are a plurality of radial slots 65 (FIG. 3) in the base 57 into which the pinched part of the lamp 61 is inserted. When the lamp is properly inserted, it is located approximately centrally in its individual dished reflecting portion 55. In the preferred arrangement, the magazine unit includes four of the lamps 61, each mounted in its respective reflecting surface 55 by means of a radial slot 65 in the base 57. It will be understood, however, that a different number of lamps and reflecting surfaces may be provided in the magazine 41. If necessary, the lamp holders consisting of the simple radial slots 65 may be provided with clamping springs 67. For other types of lamps than the pinched bottom type here illustrated, a different type of suitable lamp holder may be provided.

When the magazine unit 41 is inserted into the reflector or housing unit, one of the reflecting surfaces 55 in the magazine unit cooperates with the reflecting surfaces 25 and 27 on the housing halves 11 and 13 to provide a continuously curved complete reflecting surface. The particular reflecting surface 55 which lies to the rear of and in optical axis alinement with the surfaces 25 and 27 comprises the apex portion of the complete reflecting surface.

The outer cover or end 71 of the magazine unit is formed as a control grip. When the magazine unit is fully inserted onto the pivot pin 45, the edge of the cover 71 is flush with the adjacent side wall 31 of the housing section 13. A cavity 73 is scooped out of the cover 71, and a diametrical bar 75 serves as a gripping member to be grasped by the hand when inserting the magazine unit 41 in or removing it from the housing unit, and when rotating the magazine unit to bring a fresh lamp into operative position. The four separate angular magazine positions may be designated by numerals marked on the end 71 of the magazine unit and successively brought into alinement with an index mark or reference point on the housing as the magazine is turned to bring successive fresh flash bulbs into operative position.

The pivot pin 45 on which the magazine unit 41 is fitted for rotational movement is equipped at its base with a circumferentially and radially extending guide flange 81 which cooperates with a radial pin 83 (FIG. 5) on the magazine 41. The radial pin or projection 83 is slid through an opening 85 in the guide flange 81, and upon rotation of the magazine 41 the pin 83 slides behind the guide flange 81 to fasten the magazine unit in place. After a complete revolution of the magazine it may be extracted from the reflector unit by pulling the radial pin 83 back through the opening 85. A compression spring 89 and attached ring 91 are preferably mounted on the pin 45 to be compressed on fitting the magazine, so that after the last lamp 61 has been used, the magazine 41 is automatically ejected part way from the housing and thereby makes it known to the user that all of the lamps have been used. In addition to the opening 85 through which the pin 83 may pass completely, the flange 81 also preferably has, on its right hand face, a series of slight depressions indicated schematically at 93, in each one of which depressions the pin 83 may be resiliently seated by the pressure of the spring 89, as the magazine unit is rotated, to indicate that one of the flash bulbs and its reflecting portion 55 is properly alined with the housing reflecting portions 25 and 27.

Figure 4:
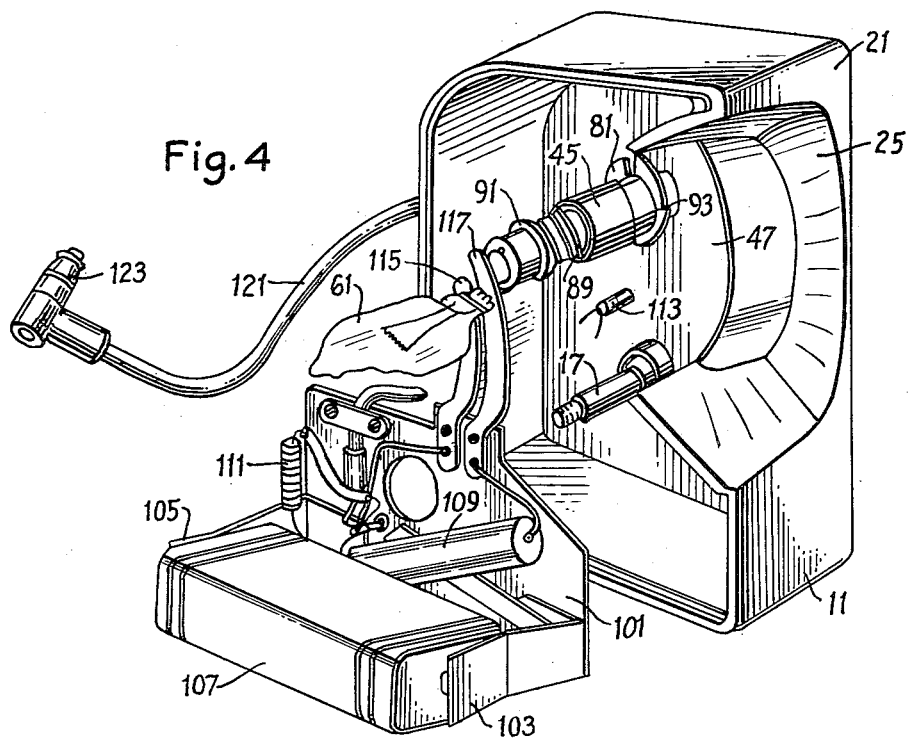
FIG. 4 is an exploded perspective view of half of the housing unit with certain electrical parts displaced.

The power supply of the lighting unit is best shown in FIG. 4 and includes an insulating base bracket 101 having projecting holders 103 and 105 for the battery 107. The electrical circuit includes a capacitor 109 and a protective resistor 111, with the usual circuit arrangement and connections, and also a cable connection 113. The power supply unit is slid into the base of the housing halves 11 and 13, beneath and behind the reflecting surface portions 25 and 27. The supply of current to the lamps 61 is achieved by two leaf springs 115 and 117 which project upwardly in position to be respectively engaged by the two electrodes 63 of each lamp as the lamp is rotated into operative position. Of course, the power supply may take any desired alternative form.

The mounting of the flash lighting unit on a photographic camera may be effected in any of the usual or suitable manners. The connection to the flash contact of the camera is provided by a conventional electric cable 121 and plug 123 in the usual way.

The operation of the magazine flash lighting apparatus which has been described is believed to be clear from the previous description. An advantage of the invention is that the mechanical and space requirements for the loading of the magazine and rotating the lamps into operative position are reduced to a minimum. At the same time the housing unit is very compact and has a smooth external form enabling it to be carried in a large coat pocket. The individual magazine unit also has a smooth external form, and the handling and operation of the apparatus are very simple.

In using the lighting apparatus with a different type of lamp bulb than the pinched base type here illustrated, the reflector or housing unit remains usable without modification while it is only necessary to adapt the magazine lamp holding arrangement for the different types of lamps. Finally, the spent lamps are not immediately ejected, which is a nuisance on many occasions, or at least raises the problem of disposal of the used lamps. The used lamps remain in position until the entire magazine unit is removed from the housing unit, whereupon the spent lamps may be replaced with new lamps.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. Flash lighting apparatus for use with a photographic camera and comprising a reflector unit and a magazine unit, said reflector unit including a housing having a portion of an inwardly dished reflecting surface, means defining a cylindrical bore extending laterally through said housing, a pivot pin mounted on said housing in said bore and disposed approximately at the apex of said reflecting surface and perpendicular to its optical axis, said magazine unit being in the form of a drum received rotatably and detachably on said pivot pin, a base and a plurality of angularly spaced recesses on said magazine unit, a flash lamp mounted on said base within each of said recesses with its longitudinal axis parallel to said pivot pin, rotation of said magazine unit moving each of said lamps successively into an operative position with its respective recess forming the apex of said reflecting surface, a power supply device contained within the housing of said reflector unit for supplying energy to said lamps, a guide flange on said pivot pin having an opening, and a projection on said drum adapted to pass through said opening to permit axial insertion and removal of said drum only in a fixed angular position, said drum when in other angular positions rotating on said pivot pin without substantial axial movement, to bring successive flash lamps into operative position.

2. A construction as defined in claim 1, wherein said power supply device has a double contact spring arranged to contact and energize said lamps only when in said operative position.

3. A construction as defined in claim 1, further including a compression spring on said pivot pin arranged to be compressed upon inserting said magazine drum and acting as an ejector spring for the drum after one complete revolution.

4. Flash lighting apparatus for use with a photographic camera, said apparatus comprising a hollow housing unit and a magazine unit detachably mounted therein, said housing unit including a stationary bearing pin, means forming a retaining shoulder on said pin and a gap in said shoulder, and wall portions forming a stationary forward portion of a reflector having an optical axis substantially intersecting and perpendicular to said bearing pin, said housing unit also having a magazine inserting and removing opening axially alined with said bearing pin and offset from said reflector portion, said magazine unit having a portion for receiving said bearing pin and for rotating thereon, socket means on said magazine unit for holding a plurality of electric flash lamps at intervals around said bearing pin and in circumferentially spaced relation to each other, said magazine unit also having separate partial reflector portions surrounding each flash lamp and each shaped to mate in turn with the reflector portion on the housing unit as the magazine unit is turned on said pin while remaining mounted thereon within said housing unit, spring means on said pin tending to eject said magazine unit partially from said housing unit in a direction axially of said pin, and retaining means on said magazine unit for engaging said retaining shoulder on said pin to retain said magazine unit rotatably on said pin and against axial movement therein except when said magazine unit is turned to a position in which said retaining means is opposite said gap in said shoulder, in which position said spring means may eject said magazine unit partially from said housing unit.

References Cited in the file of this patent

UNITED STATES PATENTS

| | | |
|---|---|---|
| 2,096,270 | Worden | Oct. 19, 1937 |
| 2,170,552 | De Porter | Aug. 22, 1939 |
| 2,309,448 | Grunwald | Jan. 26, 1943 |
| 2,853,595 | Baldwin | Sept. 23, 1958 |
| 2,880,306 | Witte | Mar. 31, 1959 |
| 2,892,073 | Michatek et al. | June 23, 1959 |

FOREIGN PATENTS

| | | |
|---|---|---|
| 164,236 | Austria | Oct. 25, 1949 |
| 166,025 | Austria | May 25, 1950 |